Nov. 10, 1959  J. W. KRYSTOSEK  2,912,213
CLAMPING STRUCTURE
Filed Nov. 8, 1954
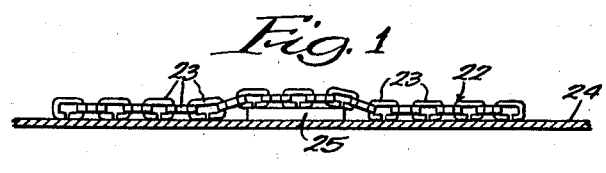
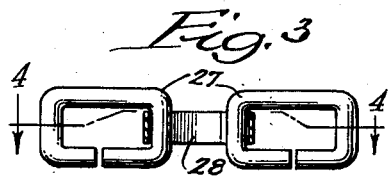 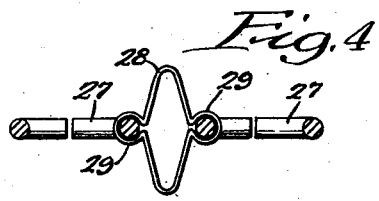
INVENTOR:
Joseph W. Krystosek,
BY
Dawson, Tilton & Graham
ATTORNEYS.

United States Patent Office 2,912,213
Patented Nov. 10, 1959

---

2,912,213

CLAMPING STRUCTURE

Joseph W. Krystosek, Lombard, Ill.

Application November 8, 1954, Serial No. 467,537

3 Claims. (Cl. 248—361)

This invention relates to a clamping structure, and more particularly to a magnetic clamping structure useful in anchoring articles to a surface subject to vibration or movement generally that might ordinarily dislodge an article supported freely thereon.

There are numerous uses for a clamp that is effective to anchor articles to surfaces, for as is well known there are innumerable environments wherein surfaces on which it is desired to support articles are subject to movement. For example, in vehicles and in industrial machinery there is considerable inherent vibration, with the result that articles cannot be supported upon any selected surface unless such article is clamped thereto. Another example is a conveyor wherein articles received thereon are transported from one location to another. Ordinarily, such conveyors are equipped with pockets for receiving articles, or are sufficiently large so that slight shifting of the articles supported thereon is relatively unimportant. However, as is apparent, substantial advantages may accrue if some ready means can be provided for quickly and easily clamping articles in preselected positions thereon.

It is, accordingly, an object of this invention to provide a clamping structure that can be used for quickly and easily securing articles to surfaces or other members, and wherein ready removability or release of the articles is provided by the clamp means. Another object is in providing a magnetic clamping structure having utility in anchoring articles, whether large or small, in preselected positions upon surfaces that may be subject to movements that would ordinarily shift and dislodge the articles from the surface.

Still another object is in the provision of magnets joined together by means permitting ready flexing of the resulting clamp assembly whereby the clamp can be drawn tightly over articles supported upon a surface to securely anchor those articles in position thereon. A further object is in providing elastic couplings or connectors between magnets to form a clamp structure with the result that the magnets can be positioned upon a surface so that the clamp structure can be drawn over an article to resiliently bind it on the surface. Additional objects and advantages will appear as the specification proceeds.

Embodiments of the invention are illustrated in the accompanying drawing, in which:

Figure 1 is a side view in elevation of a magnetic clamp embodying the invention, and in which a support surface is shown in cross section; Figure 2 is a side view in elevation of a modified form of clamp; Figure 3 is an enlarged longitudinal sectional view of a portion of the clamp structure shown in Figure 2; and Figure 4 is a horizontal sectional view taken on the line 4—4 of Figure 3.

The magnetic clamping structure is useful in substantially all environments wherein it is desired to clamp or secure articles in position upon a surface that is formed, at least in part, from one of the magnetic metals. Such metals are well known and need not be listed; by way of example, iron derivatives such as steel may form the support surface. In the specific illustration of Figure 1, the support surface may be the dashboard of an automobile, and it has been found that the clamp structure is particularly useful in securing articles to an automobile dashboard. Supported on the dashboard or surface is an article, and it is anchored in a preselected position thereon by the clamp structure that is designated generally with the numeral 22.

In the form of the invention shown in Figure 1, the clamping structure is designated generally with the numeral 22 and comprises a link chain having a plurality of interconnected links 23. At least some of the links 23 are magnetized and, if desired, all of the links may be magnetized. It is seen that the links 23 have generally a C-shape. In the specific illustration, the poles of the C-shaped magnets are all adjacent the support surface 24. The chain is drawn over the article 25 and is operative to clamp the article in position upon the surface 24.

A modified form of magnet is shown in Figure 2, and is there designated generally with the numeral 26. The clamp 26 also comprises a link chain composed of links 27 and 28. The links 27, or at least some of them, are magnetized and, as is shown most clearly in Figures 3 and 4, are generally C-shaped. The alternate links 28 that are interposed between the magnet links 27 are non-magnetic and are preferably resilient. These links may be made, for example, from Phosphor bronze that is well known in the spring art. The non-magnetic links 28, while resilient, are relatively stiff and serve to space apart the links 27 and thereby aid in maintaining the shape of the link chain clamp 26. The links 28 may have clamp portions 29 that are drawn about portions of the links 27 and tightly grip the same.

In any of the forms of the invention illustrated and described, articles substantially irrespective of their size can be held in selected positions upon surfaces that will attract the magnetic elements. Ordinarily, the clamping structure is simply drawn over the article and it can be tightened downwardly thereon by appropriate positioning of the magnet elements. If the clamping structure is resilient, an additional tightening of the clamp upon the article is attained because of the elasticity in the band or in the links that interconnect the magnet elements. If a very small article is to be clamped to a surface, additional anchorage thereof can be attained by simply wrapping the clamp about the article.

The clamp structures have proved to be very effective and especially so for holding articles on the dashboard of an automobile. The clamps are mobile and can be shifted from place to place so that articles can be positioned in the most advantageous locations. It may be noted that articles can be removed quickly and easily and with no effort from their clamped position and, therefore, this provides an additional advantage when the clamp is used in conjunction with the dashboard of an automobile wherein it is frequently necessary to withdraw articles for immediate use without having the driver's attention diverted. Also, certain or all of the links of the clamping structure may be coated or covered with a thin layer of rubber paint or like material which will protect the support surface and article thereon from being marred or otherwise damaged.

While in the foregoing specification, embodiments of the invention have been set out in considerable detail for purposes of illustration, it will be apparent to those skilled in the art that numerous changes may be made in those details without departing from the spirit and principles of the invention.

I claim:

1. A clamping structure, comprising an elongated chain having a plurality of interconnected links defining two link groups, the links of one group being alternately related to those of the other group and comprising substantially closed, generally C-shaped magnets, the links of the other of said groups being non-magnetic and being pivotally connected at separated axes to the respective magnet links to permit articulation thereof about the respective pivotal axes therefor, said non-magnetic links also being relatively stiff to normally maintain the separated axes thereof and adjacent magnet links respectively connected thereat in spaced relation with respect to each other.

2. The clamping structure of claim 1 in which said non-magnetic links are resilient to afford elongation of said chain along the length thereof.

3. The clamping structure of claim 1 in which said non-magnetic links are generally oblong and define a major and minor axis, and in which said non-magnetic links are equipped adjacent the ends of such minor axis with generally annular spring sockets resiliently gripping the respective magnet links interconnected therewith and defining the pivotal connection therefor.

References Cited in the file of this patent

UNITED STATES PATENTS

| | | |
|---|---|---|
| 254,840 | Perry | Mar. 14, 1882 |
| 1,542,362 | Blakeley | June 16, 1925 |
| 2,177,905 | McKeehan | Oct. 31, 1939 |
| 2,247,727 | Henry | July 1, 1941 |
| 2,292,272 | Hirshfield | Aug. 4, 1942 |
| 2,372,685 | Schaich | Apr. 3, 1945 |
| 2,389,298 | Ellis | Nov. 20, 1945 |
| 2,597,601 | Sherman | May 20, 1952 |
| 2,630,155 | Kandel | Mar. 3, 1953 |